United States Patent
Huang et al.

(10) Patent No.: US 9,612,798 B2
(45) Date of Patent: Apr. 4, 2017

(54) ADDRESS INFORMATION SHOWING METHOD AND ELECTRONIC DEVICE USING THE SAME

(71) Applicant: Wistron Corporation, New Taipei (TW)

(72) Inventors: Ting-Mao Huang, New Taipei (TW); Shang-Mou Shie, New Taipei (TW)

(73) Assignee: WISTRON CORPORATION, New Taipei (TW)

( * ) Notice: Subject to any disclaimer, the term of this patent is extended or adjusted under 35 U.S.C. 154(b) by 0 days.

(21) Appl. No.: 14/937,921

(22) Filed: Nov. 11, 2015

(65) Prior Publication Data
US 2016/0328927 A1     Nov. 10, 2016

(30) Foreign Application Priority Data
May 7, 2015    (TW) .............................. 104114597 A

(51) Int. Cl.
*G08B 5/36*     (2006.01)
*G06F 7/00*     (2006.01)

(52) U.S. Cl.
CPC ..................................... *G06F 7/00* (2013.01)

(58) Field of Classification Search
CPC .... G08B 5/36; G08B 5/22; G08B 5/38; G06F 7/00; G06F 7/38; G06F 7/388; G06F 13/40; G09C 5/00; G09G 5/22; G09G 2370/042; H04B 10/116
USPC ..... 340/854.7, 870.18–870.24, 691.6, 815.4, 340/815.45, 815.48, 815.63
See application file for complete search history.

(56) References Cited

U.S. PATENT DOCUMENTS

| | | | | |
|---|---|---|---|---|
| 4,864,652 A | * | 9/1989 | Austin | H04L 1/004 398/109 |
| 5,802,329 A | * | 9/1998 | Combs | G09G 5/22 340/653 |
| 5,812,617 A | * | 9/1998 | Heckman | H03L 7/0802 340/7.38 |
| 8,144,120 B2 | | 3/2012 | Vassigh et al. | |
| 2003/0133435 A1 | * | 7/2003 | Friedrich | G06K 7/0008 370/349 |
| 2013/0335592 A1 | * | 12/2013 | Yamada | H04B 10/11 348/229.1 |

FOREIGN PATENT DOCUMENTS

| | | |
|---|---|---|
| CN | 201805437 U | 4/2011 |
| CN | 102075586 A | 5/2011 |
| CN | 201947289 U | 8/2011 |
| WO | 2004045130 A2 | 5/2004 |

OTHER PUBLICATIONS

TIPO Office Action dated May 16, 2016 in corresponding Taiwan application (No. 104114597).
English translation of TIPO Office Action dated May, 16, 2016 in corresponding Taiwan application (No. 104114597).

* cited by examiner

*Primary Examiner* — Brian Wilson
(74) *Attorney, Agent, or Firm* — McClure, Qualey & Rodack, LLP

(57) ABSTRACT

An address information showing method and an electronic device using the same are provided. The address information showing method includes the following steps. An address information is transformed to a binary code. A light of an unit identification LED is flashed to show the binary code.

18 Claims, 4 Drawing Sheets

ADDRESS INFORMATION SHOWING METHOD AND ELECTRONIC DEVICE USING THE SAME

This application claims the benefit of Taiwan application Serial No. 104114597, filed May 7, 2015, the subject matter of which is incorporated herein by reference.

BACKGROUND

Technical Field

The disclosure relates in general to an information showing method and an electronic device using the same, and more particularly to an address information showing method and an electronic device using the same.

Description of the Related Art

Along with the development of the information technology, servers are usually used for controlling the network or a plurality of computers. When one server is newly set up, the user may need to know the Baseboard Management Controller Internet Protocol Address (BMC IP Address). The user must turn on the server and then find the BMC IP Address via the BIOS. Even if the server is just used for a simple experiment or for a test on a production line, the server is still needed to be turned on for getting the BMC IP Address. It is undesirable for the user and the manpower to be wasted.

SUMMARY

The disclosure is directed to an address information showing method and an electronic device using the same. An unit identification LED is used for flashing a light to show an address information without turning on a computer or a server. It is convenience for some experiments and tests.

According to a first respect of the present invention, an address information showing method is provided. The address information showing method includes the following steps. An address information is transformed to a binary code. A light of an unit identification LED is flashed to show the binary code.

According to a second respect of the present invention, an electronic device is provided. The electronic device includes a processing unit and an unit identification LED. The processing unit is used for transforming an address information to a binary code. The unit identification LED is used for flashing a light to show the binary code.

The above and other aspects of the disclosure will become better understood with regard to the following detailed description of the non-limiting embodiments. The following description is made with reference to the accompanying drawings.

DETAILED DESCRIPTION

Figure 1:
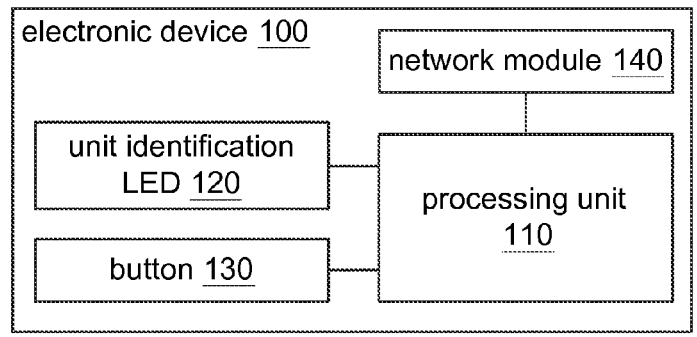
FIG. 1 shows an electronic device.

Please refer to FIG. 1, which shows an electronic device 100. An electronic device 100 may be a circuit board, a server, a desktop computer, a notebook or a smart mobile phone. The electronic device 100 includes a processing unit 110, an unit identification LED 120, at least one button 130 and a network module 140.

The processing unit 110 is used for performing several operating procedures, several determining procedures or several controlling procedures. The processing unit 110 may be a chip, a circuit board or a storage media storing a plurality of program codes.

The unit identification LED 120 can be turned on to show that one device communicates the electronic device 100. The button 130 may be a pressing key or a touching key. Usually, after pressing or touching the button 130 by the user, the unit identification LED 120 would be turned on. Therefore, the user can know whether the electronic device 100 is correctly operated by the unit identification LED 120.

The network module 140 is used for connecting a network wire. When the network wire connects to the electronic device 100, the connection state of the network module 140 can be known by observing the lighting or flashing of the unit identification LED 120. To know whether the electronic device 100 is correctly operated and to know the connection state of the network module 140 are normal functions of the unit identification LED 120.

Figure 2A:
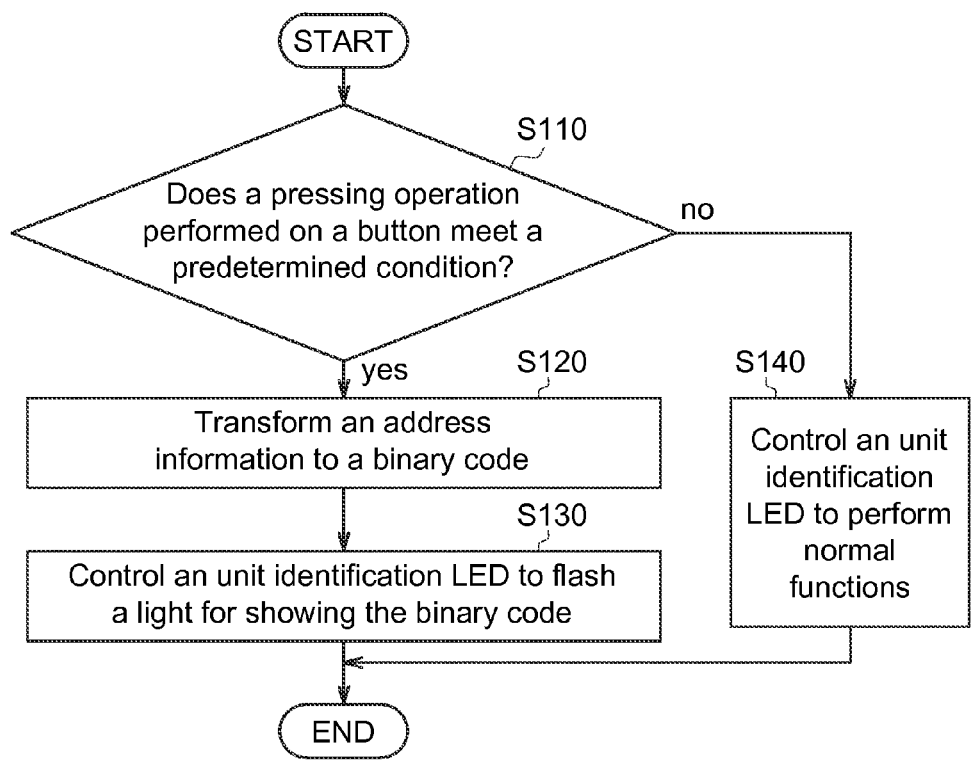
FIG. 2A is a flowchart of an address information showing method.

Please refer to FIG. 2A, which shows a flowchart of an address information showing method. In step S110, the processing unit 110 determines whether a pressing operation performed on the button 130 meets a predetermined condition. In one embodiment, the number of the button 130 is one. The predetermined condition, for example, is that a duration of pressing the button 130 is greater than a predetermined time value or a number of pressing the button 130 during a time interval is greater than a predetermined number. In the other embodiment, the number of the button 130 may be plural. The predetermined condition, for example, is the number of the buttons 130 which are pressed at the same time is equal to a predetermined number.

If the pressing operation performed on the button 130 meets the predetermined condition, then the process proceeds to step S120; if the pressing operation performed on the button 130 does not meet the predetermined condition, then the process proceeds to step S140.

In the step S120, the processing unit 110 transforms an address information to a binary code. The address information is obtained from the network module 140. For example, the address information is a Baseboard Management Controller Internet Protocol Address (BMC IP Address) or a Media Access Control Address (MAC Address). The type of address information may be an Internet Protocol version 4 (IPv4) or an Internet Protocol version 6 (IPv6). The address information comprises a plurality of decimal numbers or comprises a plurality of hexadecimal numbers.

The binary code may be a Binary Code Decimal code (BCD code), a 8421 code, an EXCESS-3 code or a Gray code. For example, a decimal number "2" in the address information can be transformed to a BCD code "0010", a decimal number "8" in the address information can be transformed to a BCD code "1000."

In step S130, the processing unit 110 controls the unit identification LED 120 to flash a light for showing the binary code. The user can obtain the binary code according to the flashing lights of the unit identification LED 120 and then know the address information.

Further, in the step S140, the processing unit 110 controls the unit identification LED 120 to perform the normal functions described above.

Figure 2B:
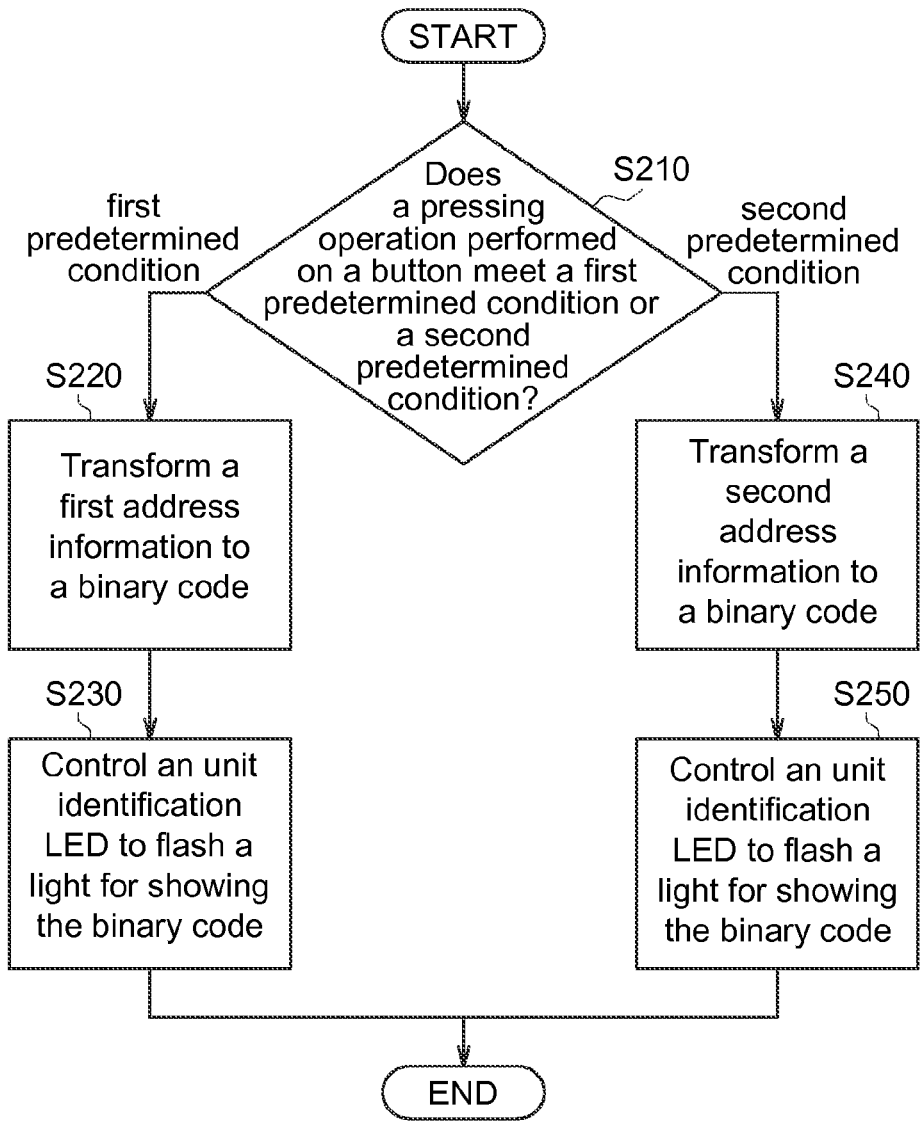
FIG. 2B is another flowchart of an address information showing method.

In another embodiment, please refer to FIG. 2B which shows another flowchart of the address information showing method. In this embodiment, the address information showing method can be used to show both of the BMC IP Address and the MAC Address. In step S210, the processing unit 110 determines whether a pressing operation performed on the button 130 meets a first predetermined condition or a second predetermined condition. If the pressing operation performed on the button 130 meets the first predetermined condition, then the process proceeds to step S220; if the pressing operation performed on the button 130 meets the second predetermined condition, then the process proceeds to step S240.

In the step S220, the processing unit 110 transforms a first address information to a binary code. The first address information may be the BMC IP Address. In the step S240, the processing unit 110 transforms a second address information to a binary code. The second address information may be the MAC Address.

In steps S230 and S250, the processing unit 110 controls the unit identification LED 120 to flash a light for showing the binary code. In steps S220, S230, S240 and S250, the user can press the button 130 again, such that the process proceeds to step S210 to determine whether the pressing operation performed on the button 130 meets the first predetermined condition or the second predetermined condition.

Figure 2C:
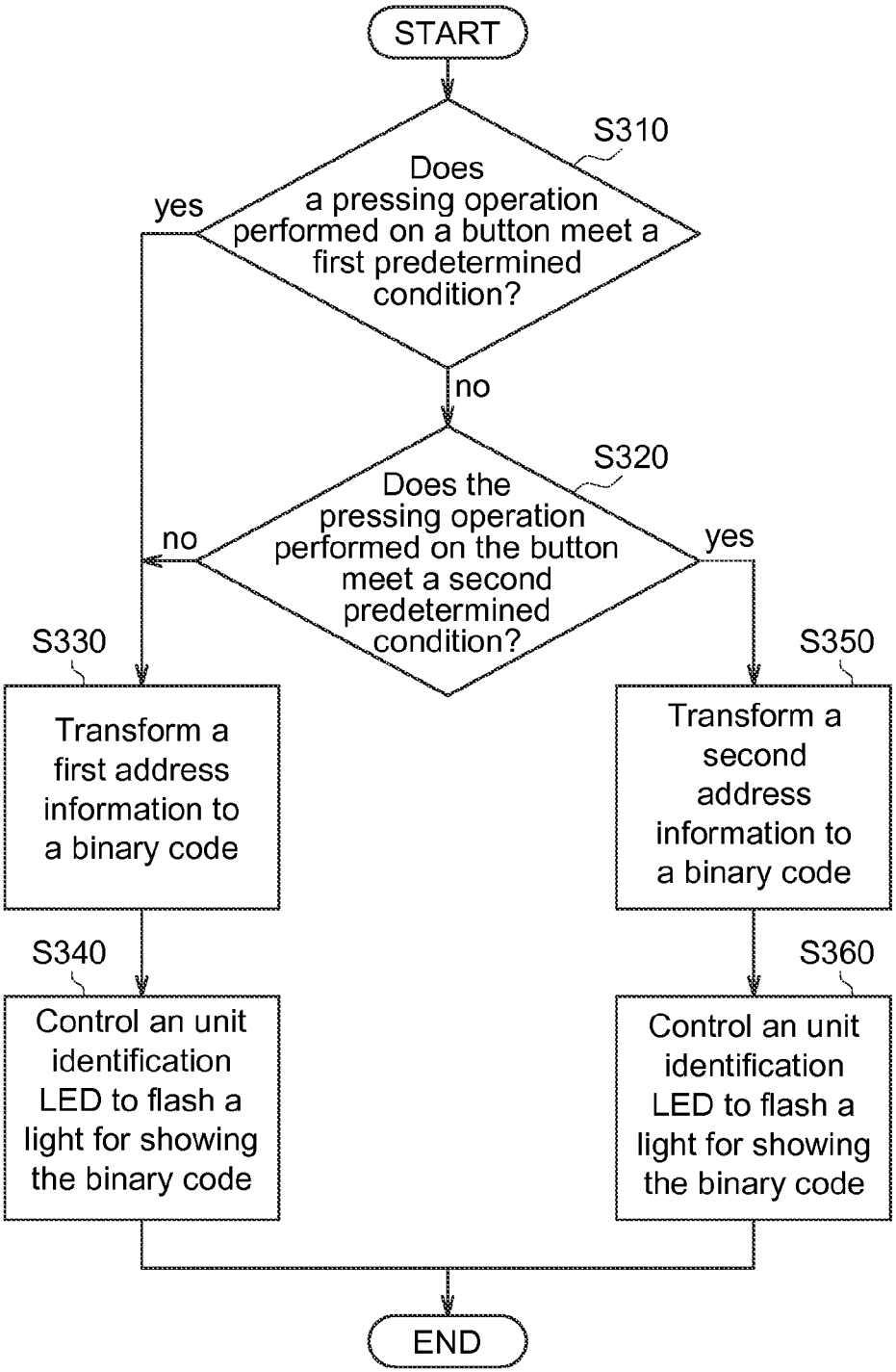
FIG. 2C is another flowchart of an address information showing method.

In another embodiment, please refer to FIG. 2C, which shows another flowchart of an address information showing method. The address information showing method can be used to show the BMC IP Address and the MAC Address by another way. In step S310, the processing unit 110 determines whether a pressing operation performed on the button 130 meets a first predetermined condition. If the pressing operation performed on the button 130 meets the first predetermined condition, then the process proceeds to step S330; if the pressing operation performed on the button 130 does not meet the first predetermined condition, then the process proceeds to step S320.

In step S320, the processing unit 110 determines whether the pressing operation performed on the button 130 meets a second predetermined condition. If the pressing operation performed on the button 130 meets the second predetermined condition, then the process proceeds to step S350; if the pressing operation performed on the button 130 does not meet the second predetermined condition, then the process proceeds to the step S330.

In the step S330, the processing unit 110 transforms a first address information to a binary code. The first address information may be the BMC IP Address. In the step S350, the processing unit 110 transforms a second address information to a binary code. The second address information may be the MAC Address.

In steps S340 and S360, the processing unit 110 controls the unit identification LED 120 to flash a light for showing the binary code.

Figure 3:
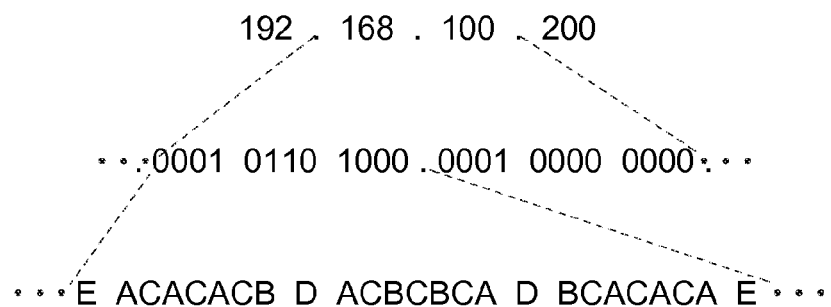
FIG. 3 shows detail steps of the step S120 and S130 in FIG. 2A according to one embodiment.

Please refer to FIG. 3 which shows detail steps of the step S120 and S130 in FIG. 2A according to one embodiment. In this embodiment, the address information comprises a plurality of decimal numbers, such as "192.168.100.200". Three partition signs "." are used to divide those decimal numbers into four groups.

As shown in FIG. 3, the decimal numbers "168" are transformed to a binary code "0001 0110 1000", the decimal numbers "100" are transformed to a binary code "0001 0000 0000." The binary code includes a plurality of binary numbers. Each of the binary numbers is "0" or "1." In the step S130 of flashing the light of the unit identification LED 120, "0" is shown by flashing the light of the unit identification LED 120 according to a first flashing arrangement A, "1" is shown by flashing the light of the unit identification LED 120 according to a second flashing arrangement B, and a change between the binary numbers is shown by flashing the light of the unit identification LED 120 according to a third flashing arrangement C. As shown in FIG. 3, the binary code "0001" is shown by sequentially flashing the light of the unit identification LED 120 according to the first flashing arrangement A, the third light arrangement C, the first light arrangement A, the third light arrangement C, the first light arrangement A, the third light arrangement C, the second flashing arrangement B.

In the example shown in FIG. 3, one decimal number is transformed to four binary numbers. In the step S130 of flashing the light of the unit identification LED 120, a change between the decimal numbers is shown by flashing the light of the unit identification LED 120 according to a fourth flashing arrangement D.

Moreover, in the step S130 of flashing the light of the unit identification LED 120, each partition sign "." is shown by flashing the light of the unit identification LED 120 according to a fifth flashing arrangement E.

In the first flashing arrangement A, the second flashing arrangement B, the third flashing arrangement C, the fourth flashing arrangement D and the fifth flashing arrangement E, the unit identification LED 120 is turned on or turned off several times. In the first flashing arrangement, the unit identification LED 120 is turned on T11 seconds for N11 times, the unit identification LED 120 is turned on T12 seconds for N12 times and the unit identification LED 120 is turned off T13 seconds for N13 times, such that "0" can be shown. For example, in the first flashing arrangement A, the unit identification LED 120 is sequentially turned on 0.2 seconds, turned off 0.1 seconds, turned on 0.2 seconds, turned off 0.1 seconds and turned on 0.1 seconds. That is to say, in the first flashing arrangement A, two long time lights and one short time light are flashed. Or, in the first flashing arrangement A, the unit identification LED 120 is turned on 1 second. That is to say, in this first flashing arrangement A, one light is flashed.

In the second flashing arrangement, the unit identification LED 120 is turned on T21 seconds for N21 times, the unit identification LED 120 is turned on T22 seconds for N22 times and the unit identification LED 120 is turned off T23 seconds for N23 times, such that "1" can be shown. For example, in the second flashing arrangement B, the unit identification LED 120 is sequentially turned on 0.2 seconds, turned off 0.1 seconds and turned on 0.1 seconds. That is to say, in the second flashing arrangement B, one long time light and one short time light are flashed. Or, in the first flashing arrangement B, the unit identification LED 120 is turned off 1 second. That is to say, in this second flashing arrangement B, the unit identification LED 120 is turned off.

In the third flashing arrangement C, the unit identification LED 120 is turned off T31 seconds once, such that the change between "0" and "1" can be shown. For example, in the third flashing arrangement C, the unit identification LED 120 is turned off 2 seconds.

In the fourth flashing arrangement D, the unit identification LED 120 is turned on T41 seconds for N41 times and the unit identification LED 120 is turned off T42 seconds for N42 times, such that the change between the decimal numbers or the change between the hexadecimal numbers can be shown. For example, in the fourth flashing arrangement D, the unit identification LED 120 is sequentially turned on 0.1 seconds, turned off 0.1 seconds, turned on 0.1 seconds, turned off 0.1 second and turned on 0.1 seconds. That is to say, in the fourth flashing arrangement D, three lights are flashed.

In the fifth flashing arrangement E, the unit identification LED 120 is turned on T51 seconds for N51 times and the unit identification LED 120 is turned off T52 seconds for N52 times, such that the partition sign can be shown. For example, in the fifth flashing arrangement E, the unit identification LED 120 is sequentially turned on 0.1 seconds, turned off 0.1 seconds, turned on 0.1 seconds, turned off 0.1 seconds, turned on 0.1 seconds, turned off 0.1 seconds, turned on 0.1 seconds, turned off 0.1 seconds and turned on 0.1 seconds. That is to say, in the fifth flashing arrangement E, five lights are flashed.

Base on above, the user can know the address information according to different flashing arrangements without turning on a computer or a server. It is convenience for some repair and installation.

Figure 4:
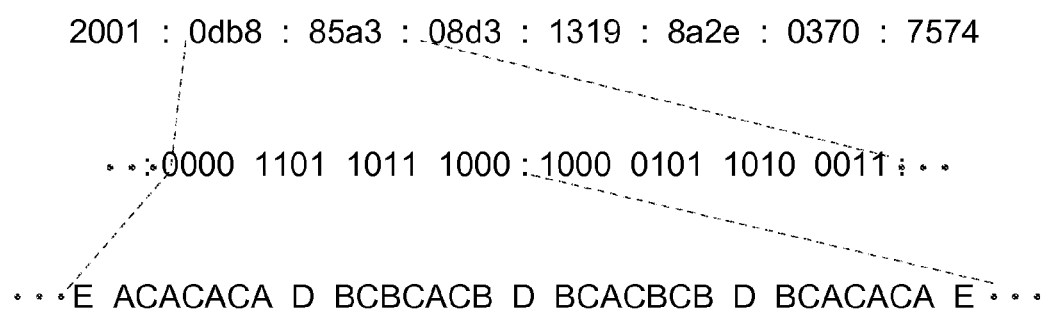
FIG. 4 shows detail steps of the step S120 and S130 in FIG. 2A according to another embodiment.

Please refer to FIG. 4, which shows detail steps of the step S120 and S130 in FIG. 2A according to another embodiment. In FIG. 4, the address information comprises a plurality of hexadecimal numbers, such as "2001:0db8:85a3: 08d3:1319:8a2e:0370:7574." Seven partition signs ":" are used to divide those hexadecimal numbers into eight groups.

As shown in FIG. 4, the hexadecimal numbers "0db8" are transformed to a binary code "0000 1101 1011 1000", the hexadecimal numbers "85a3" are transformed to a binary code "1000 0101 1010 0011." The binary code includes a plurality of binary numbers. Each of the binary numbers is "0" or "1." In the step S130 of flashing the light of the unit identification LED 120, "0" is shown by flashing the light of the unit identification LED 120 according to the first flashing arrangement A, "1" is shown by flashing the light of the unit identification LED 120 according to the second flashing arrangement B, and a change between the binary numbers is shown by flashing the light of the unit identification LED 120 according to the third flashing arrangement C. As shown in FIG. 4, the binary code "1101" is shown by sequentially flashing the light of the unit identification LED 120 according to the first flashing arrangement B, the third light arrangement C, the first light arrangement B, the third light arrangement C, the first light arrangement A, the third light arrangement C and the second flashing arrangement B.

In FIG. 4, one hexadecimal number is transformed to four binary numbers. In the step S130 of flashing the light of the unit identification LED 120, a change between the hexadecimal numbers is shown by flashing the light of the unit identification LED 120 according to the fourth flashing arrangement D.

Moreover, in the step S130 of flashing the light of the unit identification LED 120, each partition sign ":" is shown by flashing the light of the unit identification LED 120 according to the fifth flashing arrangement E.

Base on above, the user can know the decimal numbers or the hexadecimal numbers of the address information according different flashing arrangements without turning on a computer or a server. It is convenience for some experiments and tests.

While the disclosure has been described by way of example and in terms of the exemplary embodiment(s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An address information showing method, comprising: transforming address information to a binary code; and flashing a light of an unit identification LED to show the binary code;
   wherein the binary code includes a plurality of binary numbers;
   each of the binary numbers is "1" or "0";
   in the step of flashing the light of the unit identification LED, "0" is shown by flashing the light of the unit identification LED according to a first flashing arrangement, "1" is shown by flashing the light of the unit identification LED according to a second flashing arrangement, and a change between the binary numbers including a change from "0" to "1" and a change from "1" to "0" is shown by flashing the light of the unit identification LED according to a third flashing arrangement.

2. The address information showing method according to claim 1, wherein the binary code is a Binary Code Decimal code (BCD code), a 8421 code, an EXCESS-3 code or a Gray code.

3. The address information showing method according to claim 1, further comprising:
   determining whether a pressing operation preformed on at least one button meets a predetermined condition;
   wherein if the pressing operation performed on the button meets the predetermined condition, then the step of transforming the address information is performed.

4. The address information showing method according to claim 1, wherein
   in the first flashing arrangement, the light of the unit identification LED is turned on T11 seconds for N11 times, the light of the unit identification LED is turned on T12 seconds for N12 times and the light of the unit identification LED is turned off T13 seconds for N13 times;
   in the second flashing arrangement, the light of the unit identification LED is turned on T21 seconds for N21 times, the light of the unit identification LED is turned on T22 seconds for N22 times and the light of the unit identification LED is turned off T23 seconds for N23 times; and
   in the third flashing arrangement, the light of the unit identification LED is turned off T31 seconds once.

5. The address information showing method according to claim 1, wherein
   the address information comprises a plurality of decimal numbers or comprises a plurality of hexadecimal numbers;
   in the step of flashing the light of the unit identification LED, a change between the decimal numbers or a change between the hexadecimal numbers is shown by flashing the light of the unit identification LED according to a fourth flashing arrangement.

6. The address information showing method according to claim 5, wherein in the fourth flashing arrangement, the light of the unit identification LED is turned on T41 seconds for N41 times and the light of the unit identification LED is turned off T42 seconds for N42 times.

7. The address information showing method according to claim 5, wherein
   the address information further comprises a partition sign;

in the step of flashing the light of the unit identification LED, the partition sign is shown by flashing the light of the unit identification LED according to a fifth flashing arrangement.

8. The address information showing method according to claim 7, wherein in the fifth flashing arrangement, the light of the unit identification LED is turned on T51 seconds for N51 times and the light of the unit identification LED is turned off T52 seconds for N52 times.

9. The address information showing method according to claim 1, wherein the address information is a Baseboard Management Controller Internet Protocol Address (BMC IP Address) or a Media Access Control Address (MAC Address).

10. An electronic device, comprising:
- a processing unit for transforming address information to a binary code; and
- an unit identification LED used for flashing a light to show the binary code;
- wherein the binary code includes a plurality of binary numbers;
- each of the binary numbers is "1" or "0";
- wherein in flashing the light of the unit identification LED, "0" is shown by flashing the light of the unit identification LED according to a first flashing arrangement, "1" is shown by flashing the light of the unit identification LED according to a second flashing arrangement, and a change between the binary numbers including a change from "0" to "1" and a change from "1" to "0" is shown by flashing the light of the unit identification LED according to a third flashing arrangement.

11. The electronic device according to claim 10, wherein the binary code is a Binary Code Decimal code (BCD code), a 8421 code, an EXCESS-3 code or a Gray code.

12. The electronic device according to claim 10, further comprising:
- at least one button, wherein the processing unit is further for determining whether a pressing operation performed on the button meets a predetermined condition; if the pressing operation performed on the button meets the predetermined condition, the processing unit transforms the address information.

13. The electronic device according to claim 10, wherein in the first flashing arrangement, the light of the unit identification LED is turned on T11 seconds for N11 times, the light of the unit identification LED is turned on T12 seconds for N12 times and the light of the unit identification LED is turned off T13 seconds for N13 times;
- in the second flashing arrangement, the light of the unit identification LED is turned on T21 seconds for N21 times, the light of the unit identification LED is turned on T22 seconds for N22 times and the light of the unit identification LED is turned off T23 seconds for N23 times; and
- in the third flashing arrangement, the light of the unit identification LED is turned off T31 seconds once.

14. The electronic device according to claim 10, wherein the address information comprises a plurality of decimal numbers or comprises a plurality of hexadecimal numbers;
- a change between the decimal numbers or a change between the hexadecimal numbers is shown by flashing the light of the unit identification LED according to a fourth flashing arrangement.

15. The electronic device according to claim 14, wherein in the fourth flashing arrangement, the light of the unit identification LED is turned on T41 seconds for N41 times and the light of the unit identification LED is turned off T42 seconds for N42 times.

16. The electronic device according to claim 14, wherein the address information further comprises a partition sign, and the partition sign is shown by flashing the light of the unit identification LED according to a fifth flashing arrangement.

17. The electronic device according to claim 16, wherein in the fifth flashing arrangement, the light of the unit identification LED is turned on T51 second for N51 times and the light of the unit identification LED is turned off T52 seconds for N52 times.

18. The electronic device according to claim 10, wherein the address information is a Baseboard Management Controller Internet Protocol Address (BMC IP Address) or a Media Access Control Address (MAC Address).

* * * * *